(12) United States Patent
Barrenscheen

(10) Patent No.: US 10,649,871 B2
(45) Date of Patent: May 12, 2020

(54) DEVICE WITH LOW-OHMIC CIRCUIT PATH

(71) Applicant: Infineon Technologies AG, Neubiberg (DE)

(72) Inventor: Jens Barrenscheen, Munich (DE)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 15/130,374

(22) Filed: Apr. 15, 2016

(65) Prior Publication Data
US 2017/0300397 A1  Oct. 19, 2017

(51) Int. Cl.
| | | |
|---|---|---|
| G06F 3/00 | (2006.01) | |
| G06F 5/00 | (2006.01) | |
| G06F 13/00 | (2006.01) | |
| G06F 11/30 | (2006.01) | |
| G06F 13/364 | (2006.01) | |
| G06F 13/42 | (2006.01) | |
| G06F 13/40 | (2006.01) | |
| G06F 11/22 | (2006.01) | |
| G06F 3/06 | (2006.01) | |

(52) U.S. Cl.
CPC ...... *G06F 11/3051* (2013.01); *G06F 11/2221* (2013.01); *G06F 11/3062* (2013.01); *G06F 13/364* (2013.01); *G06F 13/4022* (2013.01); *G06F 13/4282* (2013.01); *G06F 3/0635* (2013.01)

(58) Field of Classification Search
CPC .. G06F 13/37; G06F 13/4247; G06F 13/4282; G06F 3/0635

USPC .......................................................... 710/38
See application file for complete search history.

(56) References Cited

U.S. PATENT DOCUMENTS

| | | | | |
|---|---|---|---|---|
| 9,332,567 | B1* | 5/2016 | Ali | H04W 24/04 |
| 2006/0187969 | A1* | 8/2006 | Kadowaki | H04L 5/16 |
| | | | | 370/516 |
| 2011/0051296 | A1* | 3/2011 | Ando | H03K 17/0822 |
| | | | | 361/18 |
| 2012/0146705 | A1* | 6/2012 | Den Besten | H03K 17/005 |
| | | | | 327/333 |
| 2012/0220245 | A1* | 8/2012 | Gossmann | H04B 1/006 |
| | | | | 455/95 |
| 2012/0284441 | A1* | 11/2012 | Landman | G06F 13/4295 |
| | | | | 710/110 |
| 2013/0009674 | A1* | 1/2013 | Reese | H03K 3/0315 |
| | | | | 327/109 |
| 2013/0009694 | A1* | 1/2013 | Camarota | H01L 22/22 |
| | | | | 327/526 |
| 2013/0069612 | A1* | 3/2013 | Feldtkeller | H02H 5/048 |
| | | | | 323/284 |
| 2013/0282941 | A1* | 10/2013 | van Dijk | H04L 12/403 |
| | | | | 710/110 |
| 2015/0277401 | A1* | 10/2015 | Hsiao | G05B 15/02 |
| | | | | 700/40 |

* cited by examiner

*Primary Examiner* — Getente A Yimer
(74) *Attorney, Agent, or Firm* — Schiff Hardin LLP

(57) ABSTRACT

A device, including a low-ohmic circuit path; a normal operation circuit path coupled in parallel with the low-ohmic circuit path; and a circuit element configured to select between the low-ohmic circuit path and the normal operation circuit path.

22 Claims, 3 Drawing Sheets

DEVICE WITH LOW-OHMIC CIRCUIT PATH

TECHNICAL FIELD

The present disclosure generally relates to a daisy-chain circuit of slave devices allowing continuation of operation even when one or more of the slave devices is/are not powered.

BACKGROUND

In many control applications, a master device (e.g., a microcontroller) is coupled to one or more slave devices located a distance from the master device. These slave devices fulfill tasks such as measuring a sensor value or outputting power to drive actuators.

The master device may be coupled to the slave devices using any of several topologies. Example topologies include a linear bus structure (e.g., Controller Area Network (CAN) or Local Interconnect Network (LIN)), a ring structure (e.g., Media Oriented Systems Transport (MOST) or daisy-chain), and a peer-to-peer structure (i.e., each slave device individually coupled to the master device, such as in a star network).

The daisy-chain circuit may be either closed or open. A closed daisy-chain circuit is one which data passes from the master device through the slave devices and back to the master device, that is, the master device transmits and receives data that has been transmitted through the slave devices.

The open daisy-chain circuit is one in which data is transmitted downstream from the master device through the slave devices, and then upstream through the same slave devices to return to the master device. The open daisy-chain circuit is often used where the slave devices are located in increasing distance from the master device.

If a daisy-chain circuit is used in safety-relevant applications, specific measures should be taken to ensure correct communication between the master device and the slave devices. Commonly used techniques include a checksum, a check of the data exchange timing, a connectivity check between the devices, and pull-up or pull-down devices at all inputs to ensure a safe input level in case of an open connection. Each of these techniques requires an assumption that the devices, especially the slave devices, are correctly powered. If a slave device is not powered, the communication is interrupted because an output driver of the unpowered slave device drives an undefined voltage (e.g., tristate or floating), and an input driver is unable to detect an input voltage.

DESCRIPTION OF THE ASPECTS

The present disclosure is directed to a daisy-chain circuit of slave devices allowing continuation of operation even when one or more of the slave devices is/are not powered.

Figure 1:
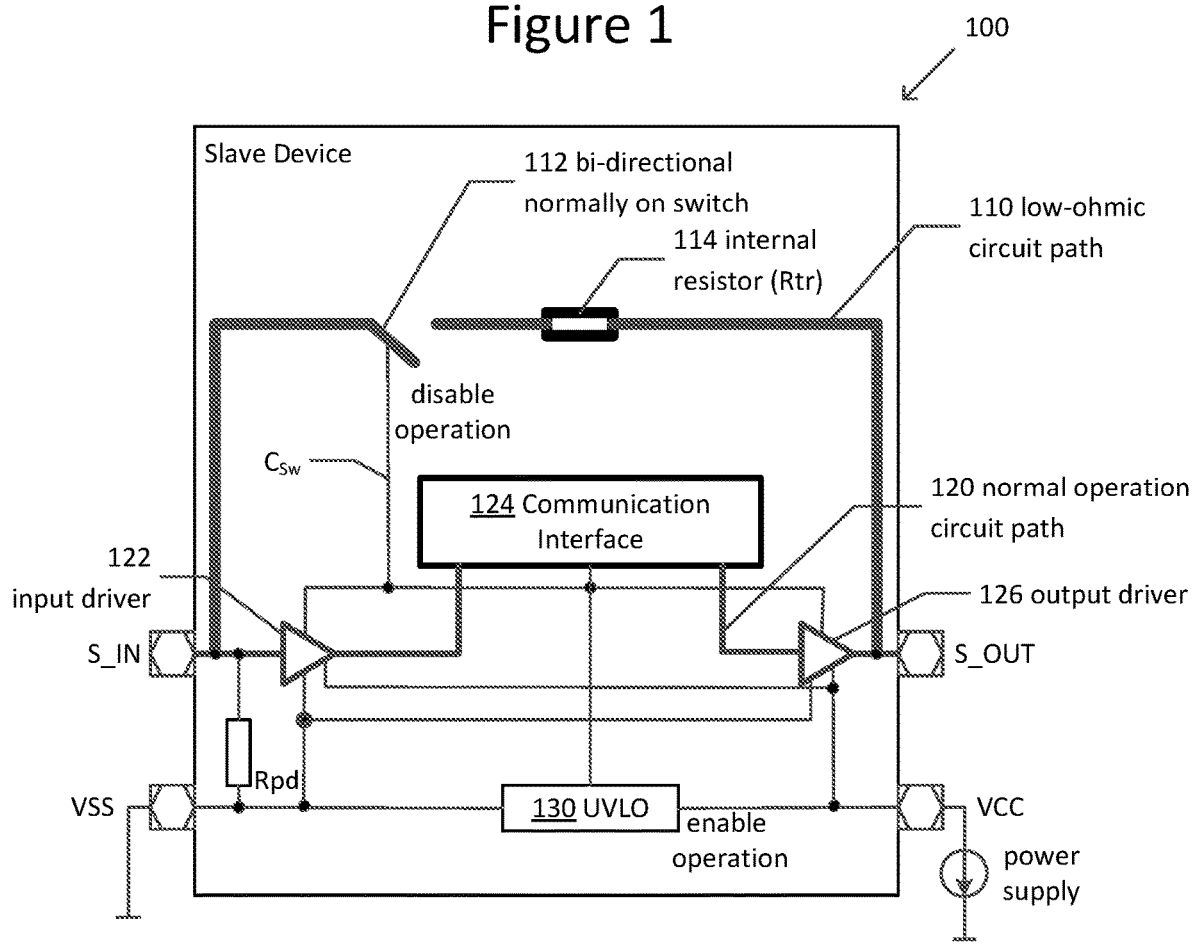
FIG. 1 illustrates a schematic diagram of a slave device in accordance with an aspect of the disclosure.

FIG. 1 illustrates a schematic diagram of a slave device 100 in accordance with an aspect of the disclosure.

The slave device 100 comprises a low-ohmic circuit path 110, a normal operation circuit path 120, and an under-voltage lockout (UVLO) circuit 130. The pull-down resistor Rpd is configured to force the input pin S_IN to VSS. Alternatively, the pull-down resistor Rpd may be a pull-up resistor.

The low-ohmic circuit path 110 is indicated by the heavy-weight lines. This path 110 is coupled between input pin S_IN and output pin S_OUT, and comprises a bidirectional normally-on switch 112 and an internal resistor Rtr 114. The internal resistor Rtr 114 represents an internal resistance of the switch 112.

The normal operation circuit path 120 is indicated by the medium-weight lines. This path 120 is coupled in parallel with the low-ohmic circuit path 110 between the input pin S_IN and the output pin S_OUT. The normal operation circuit path 120 comprises an input driver 122, a communication interface 124, and an output driver 126. The communication interface 124, as is known, is configured to transmit data, such as status information, and receive data, such as control information.

The UVLO circuit 130 is coupled between supply voltage terminals VSS and VCC, and is configured to select between the low-ohmic circuit path 110 and the normal operation circuit path 120. The UVLO circuit 130 selects the low-ohmic circuit path 110 when the slave device 100 is not powered; this mode may be referred to as a "transparent pin mode". When the slave device 100 is in a daisy-chain circuit and not powered, the transparent pin mode permits the daisy-chain circuit with the non-powered slave device 100 to remain in operation.

The UVLO circuit 130 is configured to select between the low-ohmic circuit path 110 and the normal operation circuit path 120 based on whether the supply voltage is above or below a predetermined threshold voltage. More specifically, if the supply voltage is not above the predetermined threshold voltage, the slave device 100 is determined to be not powered, and the UVLO circuit 130 selects the low-ohmic circuit path 110. Alternatively, if the supply voltage is above the predetermined threshold voltage, the slave device 100 is determined to be powered, and the UVLO circuit 130 selects the normal operation circuit path.

The UVLO circuit 130 selects between the low-ohmic circuit path 110 and the normal operation circuit path 120 using a control signal Csw to control the bi-directional normally-on switch 112. When the slave device 100 is not powered (i.e., in a power-saving mode or a failure mode), the switch 112 is conducting and couples the input pin S_IN directly with the output pin S_OUT. If it were not for the low-ohmic circuit path 110, a non-conducting slave device 100 would have its output pin S_OUT in a tri-state or high-ohmic mode.

In addition, or as alternative to the UVLO circuit 130, the slave device 100 may comprises a checker circuit (not shown) is configured to check a status of the slave device 100 for potential errors or failures. When an error or failure is detected, the low-ohmic circuit path 110 may be selected instead of the normal operation circuit path 120, even when the slave device 100 is powered correctly.

While the slave device 100 is shown with a bi-directional normally-on switch 112, the disclosure is not limited in this respect. The switch 112 may be replaced with an element that is suitable for the intended purpose.

Figure 2:
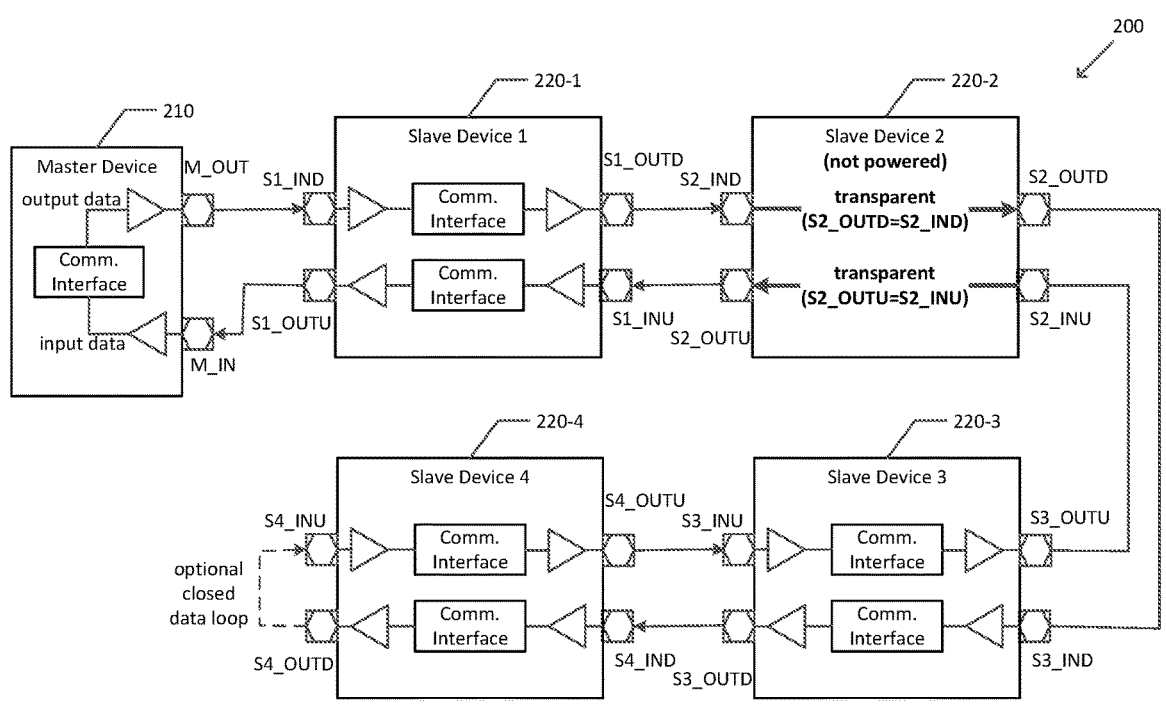
FIG. 2 illustrates a schematic diagram of a daisy-chain circuit in accordance with an aspect of the disclosure.

FIG. 2 illustrates a schematic diagram of a daisy-chain circuit 200 in accordance with an aspect of the disclosure.

The daisy-chain circuit 200 comprises a master device 210 coupled to a plurality of slave devices 220 (comprising 220-1, 220-2, 220-3, and 220-4) in an open daisy-chain circuit. Each of the slave devices 220 corresponds to the slave device 100 shown in FIG. 1. The downstream data input pins S_IN and output pins S_OUT are shown with a naming extension "D", whereas the upstream data input pins S_IN and output pins S_OUT have an extension "U". Downstream refers to data transferred in a direction from the master device 210 to the slave devices 220, and upstream refers to data transferred in a direction from the slave devices 220 to the master device 210. The master device 210 and the slave devices 220 each include one or more communication interfaces, input drivers, and output drivers. These elements are similar to the elements described with respect to FIG. 1, and thus their descriptions need not be repeated here.

Slave devices 220-1, 220-3, and 220-4 are shown as powered, that is, being able to support their respective normal operation circuit paths 120. On the other hand, slave device 220-2 is shown as not powered or in a power-saving mode. Here, slave device 220-2 has its low-ohmic circuit path 110 selected and is in transparent pin mode. The voltage level at the output pin S2_OUTD is identical to the voltage level at the input pin S2_IND, and the voltage level at the output pin S2_OUTU is identical to the voltage level at the input pin S2_INU. The master device 210 detects the daisy-chain circuit 200 being one slave device 220 shorter as compared with when the slave device 220-2 is powered. Contrary to prior configurations, even with the slave device 220-2 not powered, the communication path is not interrupted and the master device 210 can still communicate with the slave devices 220-3 and 220-4.

The master device 210 may be configured to detect a length of the daisy-chain circuit 200 by determining a length of time for a unique data pattern to be transmitted from the master device 210, through slave devices 220, and return to the master device 210. The length of time corresponds with the length of the daisy-chain circuit 200. Based on the detected length, the master device 210 can change its operating mode and react accordingly.

Further, the master device 210 may be configured to detect which of the slave devices 220 is/are not powered. Each slave device 220 transmits to the master device 210 its own unique data pattern. If a particular slave device's unique pattern is not received by the master device 210, the master device 210 determines that the particular slave device 220 is not powered.

The daisy-chain circuit 200 may be an open-loop configuration. Alternatively the daisy-chain circuit 200 may be a closed-loop configuration, as indicated by the optional dashed line coupling the output pin S4_OUTD and input pin S4_INU of slave device 220-4. Such a closed-loop configuration allows the master device 210 to monitor data that has been transmitted from the master device 210 through the slave devices 220 and back to the master device 210.

Figure 3:
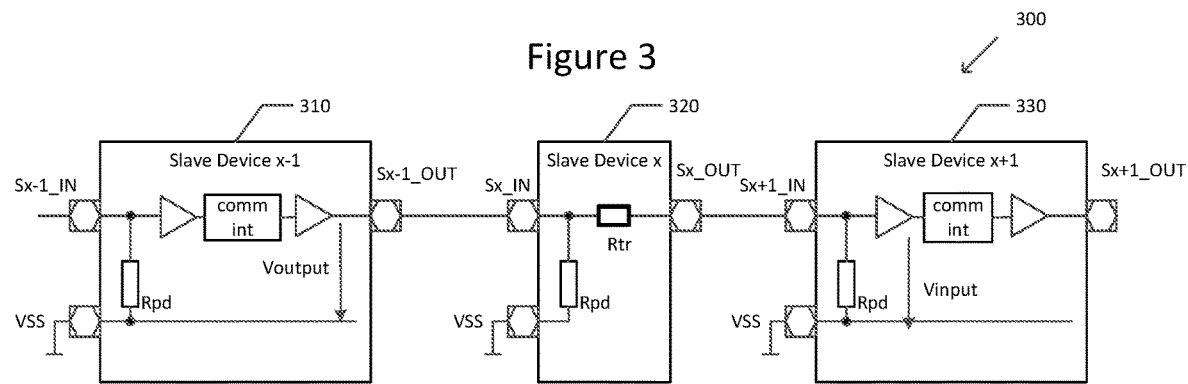
FIG. 3 illustrates a schematic diagram of a portion of a daisy-chain circuit in accordance with an aspect of the disclosure.

FIG. 3 illustrates a schematic diagram of a portion of a daisy-chain circuit 300 in accordance with an aspect of the disclosure.

The daisy-chain circuit 300 comprises slave device 310, slave device 320, and slave device 330. The slave devices 310, 320, 330 each include a communication interface, input driver, output driver, pull-down resistor Rpd, a switch, an internal resistor Rtr, an input pin S_IN, and an output pin S_OUT, some of which are not shown. These elements are similar to the elements described with respect to FIGS. 1 and 2, and thus their descriptions need not be specifically repeated here.

Slave device 320 is not powered and thus has its low-ohmic circuit path 110 selected. Again, this is referred to as being in transparent pin mode. Each of the other slave devices 310 and 330 is powered and has its normal operation circuit path 120 selected. The output driver of slave device 310 through output pin Sx−1_OUT delivers an output voltage level that is propagated through the slave device 320, through its internal resistor Rtr, and then seen at the input pin Sx+1_IN of the slave device 330.

If one slave device 320 is in transparent pin mode, such as the case as shown in FIG. 3, then:

$$Vinput(x+1)=Voutput(x-1)*Rpd/(Rpd+Rtr) \quad \text{(Equation 1)}$$

where Vinput is an input voltage, Voutput is an output voltage, x is a selected one of the n slave devices, Rpd is a pull-down resistance of each of the plurality of slave devices, and Rtr is an internal resistance of the low-ohmic circuit path of each of the plurality of slave devices.

Alternatively, if two or more slave devices between an operating output stage and a next operating input stage are in transparent pin mode, then:

$$Vinput(x+n)=Voutput(x-1)*Rpd/(Rpd+Rtr*n) \quad \text{(Equation 2)}$$

where Vinput is an input voltage, Voutput is an output voltage, n is a number of slave devices in a row of the plurality of slave devices having its low-ohmic circuit path selected, x is a selected one of the n slave devices, Rpd is a pull-down resistance of each of the plurality of slave devices, and Rtr is an internal resistance of the low-ohmic circuit path of each of the plurality of slave devices.

The resistance values of the pull-down resistors Rpd and the internal resistors Rtr can be used to detect which of the slave devices is in a transparent pin mode. It is assumed that the pull-down resistor Rpd has a resistance value in a range of 20 kΩ, and the internal resistor Rtr has a resistance value in a range of 200Ω. If the values of the pull-down resistors Rpd are well-defined with only small chip-to-chip variations, a static output current of an output driver is defined by a number of input drivers that are seen by the output driver. If slave device 320 is in normal operation and its bidirectional switch is deactivated (not conducting), the output stage of the upstream neighboring slave device 310 detects only the pull-down resistor Rpd of slave device 320. Alternatively, if slave device 320 is in transparent pin mode, the output driver of the upstream neighboring slave device 310 detects the pull-down resistors Rpd of both slave device 320 and of the downstream neighboring slave device 330. This effect can be used to detect whether slave device 320 is in transparent pin mode. Further, if slave device 320 and slave device 330 are both in transparent pin mode, the output driver of the upstream neighboring slave device 310 detects the pull-down resistors Rpd of the slave device 320, the downstream neighboring slave device 330, and a next downstream neighboring slave device coupled to slave device 330.

It is possible to detect if a neighboring device is in transparent pin mode based on an output current, or alternatively an input voltage, of the master device or of one of the slave devices. If the master device has detected or been informed that at least one of the slave devices is in transparent pin mode, the data transmitted by the master device may be configured to control the remaining slave devices. During the power-on sequence of a system comprising the master device and several slave devices, there can be time intervals when some of the slave devices are already powered, whereas other slave devices are not yet powered. The master device may be configured to control the already-powered slave devices, even when not all slave devices are already powered.

The slave device may operate in transparent pin mode after being powered or after a detected failure until a defined timing condition has been reached (i.e., waiting time) or a defined information or status of the communication pins has been detected. In this case, the input stage and the communication interface may already operate, whereas the output stage may be disabled for transparent pin mode. If the defined information has been detected or timing has been reached, the slave device may leave transparent pin mode.

Figure 4:
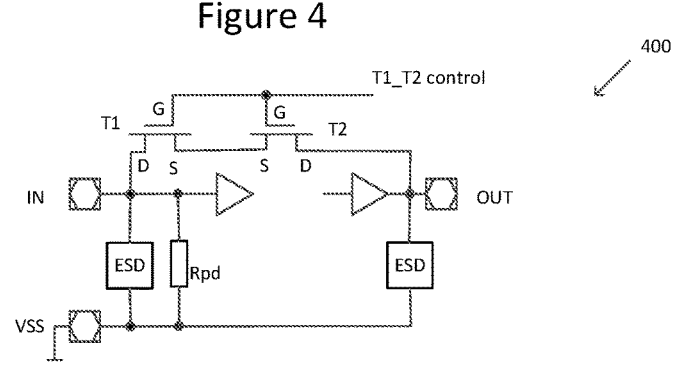
FIG. 4 illustrates a circuit diagram of a slave device with a bidirectional normally-on switch of FIG. 1.

FIG. 4 illustrates a circuit diagram of a slave device 400 with a bidirectional normally-on switch 112 of FIG. 1.

The switch 112 is comprised of two anti-serially coupled normally-on transistors T1 and T2. The anti-serial coupling prevents an unintended current path through the transistors T1, T2 when the switch 112 is disabled, that is, not conducting. More specifically, each transistor T1, T2 comprises parasitic diodes. With the anti-serial coupling, the transistors are not configured in a same direction, so neither transistor conducts on its own. Only when the switch 112 becomes active is there is a connection between the input pin IN and the output pin OUT, not when the switch 112 is inactive via parasitic diodes.

More specifically, a normally-on transistor (e.g., a depletion MOSFET) is in a conducting state when an idle voltage level (e.g., 0V) is available at its control terminal. The transistor gets switched off if the voltage level at its control terminal is actively changed (e.g., a positive voltage is applied). The bi-directional normally-on switch 112 is in blocking state for both current directions when an idle voltage level (e.g., 0V) is available at its control terminal. A single depletion MOSFET transistor can only be in blocking state for one current direction. In the other current direction, an internal, parasitic diode may conduct current. To build the bi-directional switch 112, two normally-on transistors may be connected in series, with their parasitic diodes in opposite directions. Such a structure is referred to as "anti-serial".

The Electro-Static Discharge (ESD) circuits are configured to protect the input and the output drivers against electrostatic discharge. In this example the ESD circuits are Zener diodes. A Zener diode in one direction conducts, in the other direction conducts if the voltage exceeds a certain value. Assuming there is a Zener diode of, for example, 5V, whenever the voltage at the input/output pin IN/OUT is less than 0V, the Zener diode immediately conducts, and when the voltage is between 0 and 5V, the Zener diode does not conduct. If the voltage at the input/OUT pin IN/OUT exceeds 5V, the Zener diode conducts and protects the input pin IN from destruction.

T1_T2 control is the control signal transmitted by the UVLO circuit 130 of FIG. 1. The other circuit elements are similar to those described above with respect to other figures, and thus their descriptions need not be repeated here.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A device, comprising:
   a low-ohmic circuit path coupled at one end directly to an input of the device and at the other end directly to an output of the device;
   a normal operation circuit path coupled in parallel with the low-ohmic circuit path; and
   a circuit element configured to select between the low-ohmic circuit path and the normal operation circuit path, wherein when the device is operating in a normal mode, is configured to select the normal operation circuit path, and when the device is not powered or is in a failure mode, is configured to select the low-ohmic circuit path.

2. The device of claim 1, wherein the circuit element is configured to select between the low-ohmic circuit path and the normal operation circuit path based on a supply voltage.

3. The device of claim 2, wherein:
   the circuit element comprises an under-voltage lockout (UVLO) circuit configured to detect whether the supply voltage is above a predetermined threshold voltage,
   if the supply voltage is not above the predetermined threshold voltage, the UVLO circuit selects the low-ohmic circuit path, and
   if the supply voltage is above the predetermined threshold voltage, the UVLO circuit selects the normal operation circuit path.

4. The device of claim 3, wherein the low-ohmic circuit path comprises a switch and a resistor coupled in series, and the UVLO circuit selects between the low-ohmic circuit path and the normal operation circuit path by controlling the switch.

5. The device of claim 2, further comprising:
   a checker circuit configured to check a status of the device for an error or failure, and configured to select the low-ohmic circuit path even if the device is receiving the supply voltage.

6. The device of claim 1, wherein the low-ohmic circuit path comprises a bi-directional normally-on switch between an input and an output of the device.

7. The device of claim 6, wherein the switch is comprised of two anti-serially coupled normally-on transistors.

8. The device of claim 1, wherein the circuit element is further configured to detect an operation failure of the device.

9. The device of claim 1, wherein the circuit element is further configured to switch from transparent pin mode to normal operating mode when a defined status of input(s) of the device has been detected.

10. A daisy-chain circuit, comprising:
    at least one slave device comprising:
       a low-ohmic circuit path having a first end coupled directly to an input of the at least one slave device and a second end coupled directly to an output of the at least one slave device;
       a normal operation circuit path coupled in parallel with the low-ohmic circuit path; and
       a circuit element configured to select between the low-ohmic circuit path and the normal operation circuit path, wherein when the device is operating in a normal mode, is configured to select the normal operation circuit path, and when the at least one slave device is not powered or is in a failure mode, is configured to select the low-ohmic circuit path; and a master device coupled to the at least one slave device, wherein the at least one slave device and the master device are coupled in a daisy-chain configuration, and the daisy-chain configuration is operable when the at least slave device is not powered or is in the failure mode.

11. The daisy-chain circuit of claim 10, wherein the master device is configured to detect a length of the daisy-chain circuit by determining a length of time for a unique data pattern to be transmitted from and return to the master device, wherein the length of time corresponds to the length of the daisy-chain circuit.

12. The daisy-chain circuit of claim 10, further comprising:

a plurality of slave devices of claim 1 coupled in the daisy-chain configuration.

13. The daisy-chain circuit of claim 12, wherein each of the plurality of slave devices is configured to transmit a unique data pattern to the master device, and wherein the master device is configured to detect, based on the respective unique data patterns, which of the plurality of slave devices has its low-ohmic circuit path selected.

14. The daisy-chain circuit 12, wherein an output current of the master device or of one of the plurality of slave devices is used to determine if another slave device is in transparent pin mode.

15. The daisy-chain circuit of claim 12, wherein an input voltage of the master device or of one of the plurality of slave devices is used to determine if another slave device is in transparent pin mode.

16. The daisy-chain circuit of claim 12, wherein each of the slave devices comprises a pull-down resistor configured to force an input pin of the respective slave device to ground.

17. The daisy-chain circuit of claim 16, wherein if a specific one of the plurality of slave devices has its normal operation circuit path selected, the upstream neighboring slave device is configured to detect only the pull-down resistor of the specific slave device.

18. The daisy-chain circuit of claim 16, wherein if a specific one of the plurality of slave devices has its low-ohmic circuit path selected, the upstream neighboring slave device is configured to detect the pull-down resistor of both the specific slave device and the downstream neighboring slave device.

19. The device of claim 1, wherein the device is a master device or a slave device.

20. A method of operating a device having a low-ohmic circuit path and a normal operation circuit path coupled in parallel and at one end directly to an input of the device and at the other end directly to an output of the device, the method comprising:

selecting the low-ohmic circuit path if the device is not powered or is in a failure mode;

selecting the normal operation circuit path when the device is operating in a normal mode; and switching from the low ohmic circuit path to the normal operation circuit path after some delay has elapsed, defined information has been received, or a defined status of communication pins of the device has been detected.

21. The method of claim 20, wherein the device is a master device or a slave device.

22. A method of operating a daisy-chain circuit including a master device and a plurality of slave devices, comprising:

detecting if any of the plurality of slave devices has a low-ohmic circuit path selected, wherein each of the plurality of slave devices has the low-ohmic circuit path having a first end coupled directly to an input of the respective slave device and a second end coupled directly to an output of the respective slave device, a normal operation circuit path coupled in parallel with the low-ohmic circuit path, and a circuit element configured to select between the low-ohmic circuit path and the normal operation circuit path, wherein when the device is operating in a normal mode, is configured to select the normal operation circuit path, and when the device is not powered or is in a failure mode, is configured to select the low-ohmic circuit path; and changing data transmitted by the master device according to a number of the plurality of slave devices having its normal operation circuit path selected.

* * * * *